(12) United States Patent
Rogers

(10) Patent No.: US 11,625,643 B1
(45) Date of Patent: Apr. 11, 2023

(54) SYSTEM OF IMPROVED INTELLIGENCE LEARNING AGENTS WITH HEURISTICS MANAGEMENT

(71) Applicant: WORKDONE INC., Beverly Hills, CA (US)

(72) Inventor: Joseph T. Rogers, Los Angeles, CA (US)

(*) Notice: Subject to any disclaimer, the term of this patent is extended or adjusted under 35 U.S.C. 154(b) by 813 days.

(21) Appl. No.: 16/455,648

(22) Filed: Jun. 27, 2019

Related U.S. Application Data

(60) Provisional application No. 62/690,505, filed on Jun. 27, 2018.

(51) Int. Cl.
| | | |
|---|---|---|
| G06N 20/00 | (2019.01) | |
| G06N 3/00 | (2006.01) | |
| G06F 9/451 | (2018.01) | |
| G06Q 10/10 | (2012.01) | |
| G06N 3/008 | (2023.01) | |

(52) U.S. Cl.
CPC ............. *G06N 20/00* (2019.01); *G06F 9/451* (2018.02); *G06N 3/008* (2013.01); *G06Q 10/10* (2013.01)

(58) Field of Classification Search
CPC ........ G06N 20/00; G06N 3/008; G06F 9/451; G06Q 10/10
See application file for complete search history.

(56) References Cited

U.S. PATENT DOCUMENTS

| | | | |
|---|---|---|---|
| 2011/0145326 A1* | 6/2011 | Lee | G06F 9/5038 |
| | | | 707/769 |
| 2014/0244712 A1* | 8/2014 | Walters | G06Q 10/10 |
| | | | 709/202 |
| 2018/0029226 A1* | 2/2018 | Dani | G06V 10/10 |
| 2018/0113781 A1* | 4/2018 | Kim | G06F 11/3414 |
| 2019/0324781 A1* | 10/2019 | Ramamurthy | G06F 9/45512 |

* cited by examiner

*Primary Examiner* — Roberto Borja
(74) *Attorney, Agent, or Firm* — Charles A. Rattner

(57) ABSTRACT

A system for generating intelligent software learning agents with heuristics management is disclosed. Expertise capture processes eliminate the need for programmers through the use of machine learning mechanisms that adjusts to changes over time, stays current with business rules as the learning is continuous, and allows users to process work as they always have with no interruptions or additional training required.

2 Claims, 2 Drawing Sheets

SYSTEM OF IMPROVED INTELLIGENCE LEARNING AGENTS WITH HEURISTICS MANAGEMENT

CROSS-REFERENCE TO RELATED APPLICATIONS

This application claims priority under 35 U.S.C. § 119(e) to U.S. Provisional Patent Application Ser. No. 62/690,505 entitled "System of Improved Intelligence Learning Agents with Heuristics Management" filed in the name of Rogers on Jun. 27, 2018, the entirety of which is incorporated herein by reference.

BACKGROUND

Much time is wasted by office workers performing repetitive and recurring software-based tasks. Existing robotic and artificial intelligence (AI) process automation requires complicated and expensive programming. Moreover, when internal business rules change such programmed processes must be correspondingly changed or updated, and so even more programming and re-programming is needed.

SUMMARY

The present disclosure eliminates time wasted by humans in completing, for example, repetitive office software-based tasks. The improved AI functionality disclosed herein, sometimes referred to as EXPERTISE CAPTURE, eliminates the need for a continuous staff of dedicated programmers through the use of machine learning mechanisms/routines that adjust to changes over time, stay current with business rules as the learning is continuous (i.e., older heuristics are provided with automatic expiration dates and thus become obsolete as the system continues to learn), and allow users to process work as they always have with no interruptions. No additional training of personnel is required.

BRIEF DESCRIPTION OF THE DRAWINGS

Further aspects of the present disclosure will be more readily appreciated upon review of the detailed description of its various embodiments, provided below, when taken in conjunction with the following Figures, of which.

DETAILED DESCRIPTION

The goal and technological improvement of the disclosed embodiments is to eliminate the time wasted by humans completing repetitive office software tasks (e.g., data entry, order processing, accounting and processes that are heavily dependent on procedural workflows). Software programming and processes that improve the functioning of computing devices, referred to herein as EXPERTISE CAPTURE, as now introduced, solves this technological problem.

EXPERTISE CAPTURE transparently automates repetitive tasks across popular Software-as-a-Service ("SaaS") platforms in an improved manner that differs from what has previously existed. EXPERTISE CAPTURE learns and automates tasks by recording user (i.e., worker) performed tasks and usage without the need for continuous software re-programming. The process differs from well-known prior "macro" functions in word processing and the like since AI-determined shortcuts in the workflow are determined from the monitored software-based tasks performed by human users.

Current challenges around automating worker tasks in a business environment are: (i) programmers are expensive, hard to find, and make mistakes, (ii) business process rules change frequently, and (iii) users (typically employees, vendors, or customers) are typically averse to learning how to use new software systems.

EXPERTISE CAPTURE eliminates the need for programmers through the implementation of machine learning employing usage statistics; it stays current with business rules since the learning is continuous, and allows users to process work as they always have with no interruptions. No training is required. This makes it possible to produce all manner of digital output and potentially physical output produced by users when paired, for example, with a humanoid robot.

EXPERTISE CAPTURE software components may include a WORKDONE Analytics module and a Heuristics Model that acts as the brain/mastermind of the software functionality. The WORKDONE Analytics Module collects raw work- and activity-type usage data and analytics and transmits over TCP/IP as an encrypted stream of data from the user's device (i.e., their Internet browser) to the WORKDONE Analytics repository 111, which may be a cloud-hosted platform, such as CUMULUSPRO. The Heuristics Model, on the other hand, leverages supervised machine learning to derive the work heuristics processed from the work analytics data stream stored in the repository 111.

Figure 1:
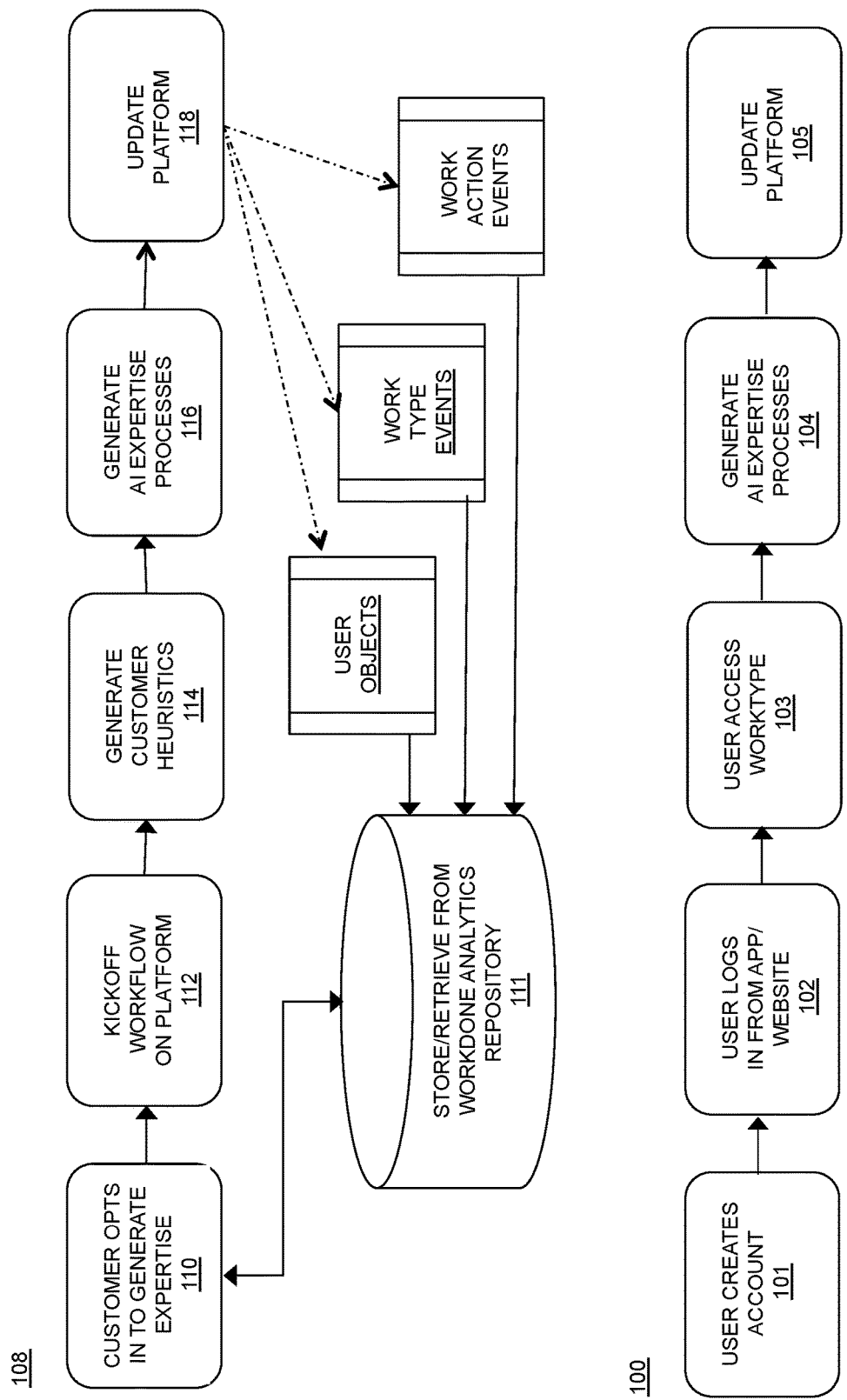
FIG. 1 depicts flowcharts of a User Login and a Learning Agent process performed by the platform of the present disclosure.

The WORKDONE Analytics Module observes patterns in processing work that will be used to create heuristics that will allow an automated software agent to perform the same work. Accordingly, the user training the "Learning Agent" does not need instruction or additional programming. A worker simply performs tasks as normal and the system learns and identifies the procedures and expected outcomes to produce the Learning Agent. Turning to FIG. 1, therein are depicted a user login process 100 and a Learning Agent process 108. The login process commences when a user creates an account with the WORKDONE platform (step 101). The user may then login to the platform from a mobile app or web browser and/or extension (step 102). The user then accesses a worktype, representing a type of task to be automated by the WORKDONE platform (step 103). The platform then generates an AI automated expertise process according to the Learning Agent process 108 (step 104). The platform is then updated and continues to refine the automated expertise process through observation of the users executions, which such updates being stored in repository 111 (step 105), after which the process 100 ends. The Learning Agent process 108 commences at step 110, when a user opts in to generate/use an automated expertise process, which may be stored, updated and retrieved from the WORKDONE Analytics Repository 111. The subject workflow is kicked off on the platform (step 112). The platform generates heuristics for the user based on recorded steps performed by one or human users who would typically execute the workflow manually (step 114). From the recorded heuristics, the platform generates an AI expertise process to replace the steps performed by human users (step 116). Finally, at step 118, the platform is updated, for example by storing generated user objects, worktype events and work action events (i.e., individual tasks performed) in the repository 111, after which the process 108 ends. In additional steps, separate software may display the activity of Learning Agent(s) on a dashboard or other graphical user interface. Machine learning heuristics will generate logical conditions based on the processing of the inbound workflow data stream that is being monitored.

In order to construct the improved software components referenced above, it was necessary to craft software that is able to complete the requisite tasks and provide the user with the useful functionality described in the foregoing. There is no existing out of the box generic functionality previously available. All components necessary for EXPERTISE CAPTURE to properly generate heuristics to allow automated completion of tasks are described herein as such. Other available components, such as a "Human/Agent Benchmark Review" are optional and meant solely for human users to achieve a level of comfort.

Additionally, EXPERTISE CAPTURE is a precursor to a Heuristics Management module (different from the Heuristics Model described herein), which is a system that will enable humans to mix and match skills to create custom-operating software Learning Agents that work without further training, as described in commonly-owned U.S. Provisional Patent Application Ser. No. 62/729,681 filed in the name of Rogers on Sep. 11, 2018, the entirety of which is hereby incorporated by reference.

Figure 2:
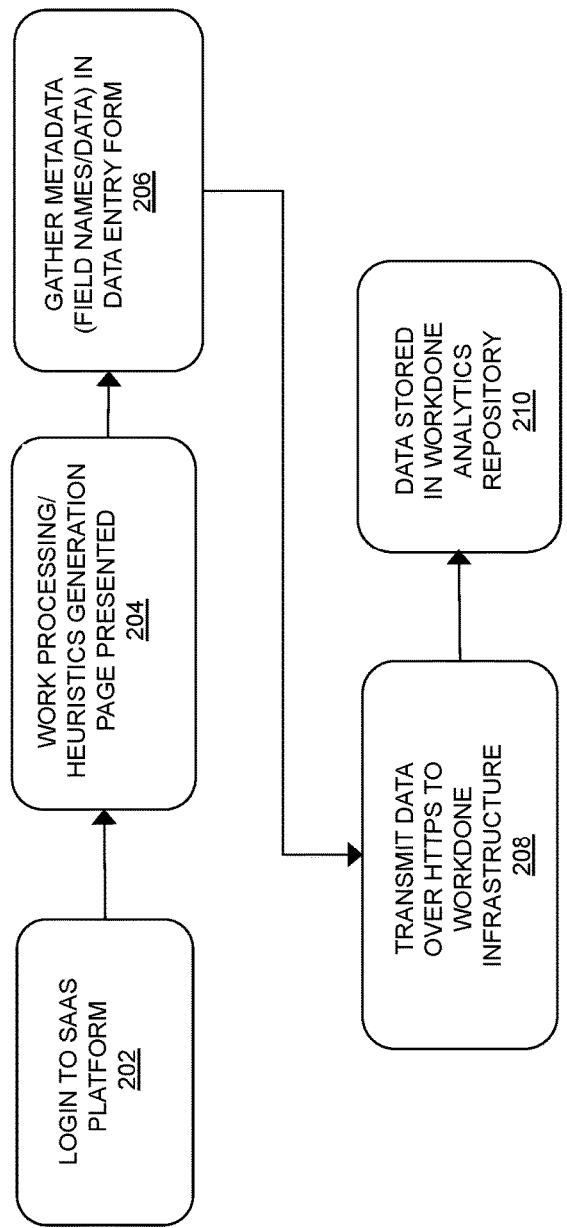
FIG. 2 is a representation of a user workflow process that may be performed by the platform of the present disclosure.

In order to use EXPERTISE CAPTURE, the user will install a WORKDONE MONITOR module from EXPERTISE CAPTURE and otherwise continue with the user's daily workload manually (See FIG. 2). Turning to FIG. 2, there is depicted a process 200 for identifying work heuristics for workflow capture. The process 200 commences at step 202, where a user logs into the platform that may operate as an "SaaS." In response, a workflow processing/heuristics generation page is presented to the user for completion (step 204). The WORKDONE platform gathers metadata, such as field names and operating data therefor, from the user entries to the workflow processing/heuristics generation page (step 206). The gathered information is transmitted over the Internet or other network to the WORKDONE platform and infrastructure (step 208). Finally, at step 201, the received data is stored in the WORKDONE analytics repository 111 for use in generating expertise processes as described herein. In additional steps, when EXPERTISE CAPTURE has created the Learning Agent and makes the Learning Agent ready for user validation, EXPERTISE CAPTURE then may notify the user to test and validate the Learning Agent's generated procedures as a quality control measure. In additional steps, after the human user is satisfied with the performance of the Learning Agent, the user can confirm the veracity of the Learning Agent and will not have to perform the specific tasks generated by the Learning Agent (i.e., the formerly manual tasks the user performed).

Additionally, in the case of tasks that require physical movement during the course of their work, WORKDONE can recreate physical movements through a humanoid robot using sensors that aid in feeding data and usage to EXPERTISE CAPTURE. Furthermore, through these efforts, it is possible that EXPERTISE CAPTURE can produce all manners of digital and potentially physical output when paired with a humanoid robot.

LISP, PYTHON, PROLOG and/or other AI programming languages may be used to implement various of the processing steps as described herein, as will be readily apparent to one of ordinary skill in the art. The specialized programming steps described herein may be particularly programmed into a computer system having a processor, memory and input/output interfaces, the operation of which is thereby enhanced and improved by the methods described herein, in a manner that is not conventionally available. The methods and processes herein are entirely implemented and executed exclusively by such specially programmed computer system. Although the best methodologies have been particularly described in the foregoing disclosure, it is to be understood that such descriptions have been provided for purposes of illustration only, and that other variations both in form and in detail can be made thereupon by those skilled in the art without departing from the spirit and scope thereof, which is defined first and foremost by the appended claims.

What is claimed is:

1. A method for improving a computing system to implement automated processes, comprising:
    recording a plurality of entries for a task performed on a computer by a human user;
    capturing heuristics related to the plurality of entries;
    generating an artificial intelligence (AI) routine to perform the task based on the plurality of entries and the heuristics;
    updating the AI routine with additional entries from the human user during additional executions of the task;
    updating the AI routine based on additional executions of the task performed by additional human users;
    determining at least one replacement step for performing the task based on the plurality of entries, the additional entries and the additional executions;
    storing the AI routine with the replacement step in a repository; and
    providing the AI routine to human users via a software as a service cloud platform.

2. The method of claim 1, further comprising:
    recording physical movements of the human user performing the task;
    updating the AI routine with recorded physical movements; and
    transmitting the AI routine to a humanoid robot in a physical environment, wherein the task AI routine is performed by the humanoid robot in the physical environment.

* * * * *